United States Patent [19]
Arman

[11] 3,867,736
[45] Feb. 25, 1975

[54] CONNECTING MEMBER FOR WINDSHIELD WIPER BLADE

[76] Inventor: Dario Arman, Piazza Adriano 15, Turin, Italy

[22] Filed: July 19, 1973

[21] Appl. No.: 380,637

[30] Foreign Application Priority Data
July 24, 1972 Italy .................................. 69398/72

[52] U.S. Cl. ............................................. 15/250.32
[51] Int. Cl. ............................................... B60s 1/40
[58] Field of Search ........ 15/250.31–250.35, 250.42

[56] References Cited
UNITED STATES PATENTS
| | | | |
|---|---|---|---|
| 3,049,743 | 8/1962 | Graczyk et al.................... | 15/250.32 |
| 3,133,304 | 5/1964 | Reese............................... | 15/250.32 |
| 3,608,124 | 9/1971 | Morton............................. | 15/250.32 |

FOREIGN PATENTS OR APPLICATIONS
| | | | |
|---|---|---|---|
| 1,024,171 | 3/1966 | Great Britain.................. | 15/250.32 |
| 1,096,916 | 12/1967 | Great Britain.................. | 15/250.32 |

*Primary Examiner*—Peter Feldman
*Attorney, Agent, or Firm*—Breitenfeld & Levine

[57] ABSTRACT

A connecting member for securing a windshield wiper blade to the oscillating arm on a motor vehicle. The connecting member comprises a tile-shaped body having a pair of parallel tabs for connecting the member to the back of a windshield wiper blade. The body is formed with holding teeth as well as with a hole defining a seat, so that it can be coupled to two different types of oscillating arms. An undulating leaf spring is arranged within the body to press an arm having holes over the holding teeth, or alternatively to press an arm having a projection into the hole seat.

4 Claims, 10 Drawing Figures

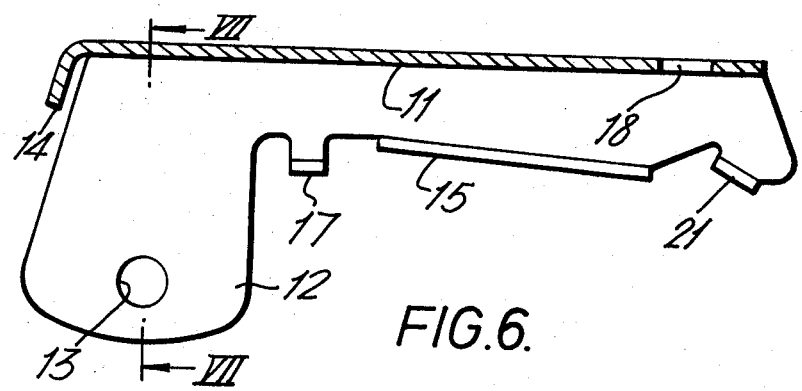
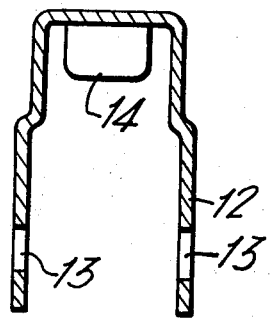
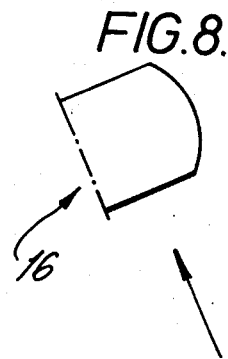
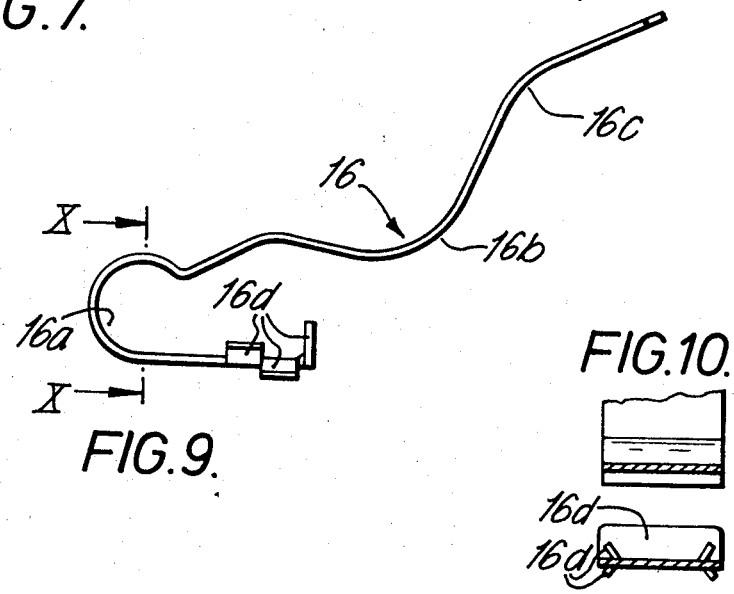

CONNECTING MEMBER FOR WINDSHIELD WIPER BLADE

In the installations of windshield wipers on motor vehicles, it is known that the wiping blades are connected to the ends of the corresponding swinging arms through a snap connecting member, shaped as a tile and articulated with respect to the back of said wiping blade and provided with a resilient member.

The present invention relates to said connecting member and the structure of the resilient member which cooperates to effect the resilient connection between the same member and the end of the corresponding swinging arm.

More specifically, the connecting member according to the invention is characterized in that it comprises a tile-shaped section provided, at one end, with a pair of symmetrical tabs having through holes therein which form the seat of the pin which articulates the connecting member with respect to the back of the wiper blade. Holding teeth are formed in the edges of the tile-shaped section for an undulating leaf spring presenting one end which protrudes from the entry of the tile-shaped member, the opposed end being substantially U-bent.

Another feature of said connecting member resides in the fact that the same is capable of receiving and retaining by coupling the ends of swinging arms provided with a retaining tooth which engages a corresponding seat formed in the bottom of the tile-shaped element, or ends of arms provided with symmetrical side notches and suitable to engage retaining teeth carried by the opposed edges of same tile-shaped element.

A further feature of said member resides in that the leaf spring mounted within the cavity of the tile-shaped member is also provided with retaining teeth to removably couple it in its operating seat.

Additional particular features of the connecting member will be seen from the specification which refers to the illustrative drawing annexed as a non-limiting example, and wherein.

Figure 1:
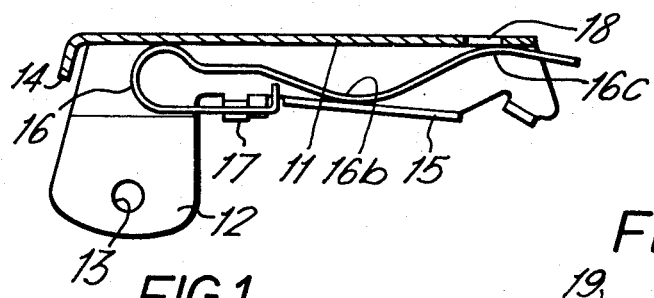
FIG. 1 is a longitudinal cross-sectional view of the complete member.
Figure 5:
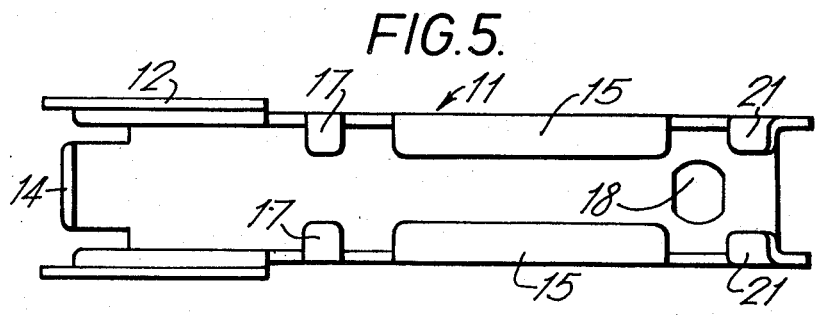

FIG. 5, in greater scale, is a bottom view of the connecting member without the blade spring;

FIG. 6 is similar to FIG. 1 and shows in a greater scale the tile-shaped element without the spring;

FIG. 7 is a cross-sectional view of the tile-shaped element along line VII—VII of FIG. 6;

FIG. 8 is a top view of the blade spring end shown in a side view on FIG. 9;

FIG. 9 is a side of the blade spring; and

FIG. 10 is a cross-sectional view of the blade spring along line X—X of FIG. 9;

With reference to the drawing, the connecting member comprises a tile-shaped element made of pressed sheet metal provided with a pair of parallel tabs 12 having coaxial holes 13 for the articulated connection of same member with respect to the back of the corresponding wiper blade. The bottom of the tile-shaped section 11 protrudes at 14 and is bent to form a stop.

The lower edges 15 of the tile-shaped section are bent and oppose one another in order to retain the leaf spring 16 which, as represented on FIG. 9, is undulated and bent to form a section 16a which is substantially U-bent, a central curved part 16b and a second curved terminal part 16c. The spring 16 is further provided with opposed teeth 16d formed by cuts in the side edges of the leaf and located as to cooperate with the stop teeth 17 formed in the opposed sides of the tile-shaped element 11.

Figure 3:
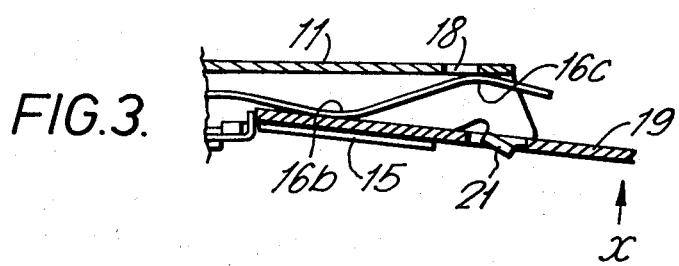
FIG. 3 is similar to FIG. 1 and shows particularly the back portion of said connecting member with the arm of FIG. 2 coupled in it.
Figure 4:
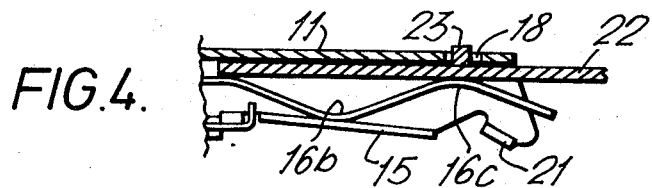
FIG. 4 is similar to FIGS. 1 and 3 and shows another embodiment of the coupled arm end.

As represented on FIGS. 1, 3 and 4, when spring 16 is mounted within the element 11, its curved part 16b pushes against edges 15 of said element, while the curved part 16c pushes against the bottom of same element where a seat hole 18 is formed through said bottom.

To the complete member, that is, formed by the tile-shaped element 11 and spring 16, the ends of two different types of swinging arms may be coupled.

Figure 2:
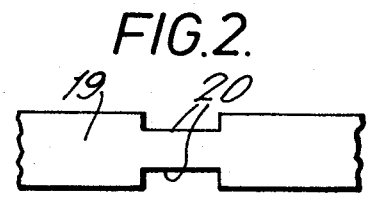
FIG. 2 is a top view of the end of one arm which may be coupled to the member of FIG. 1.

As represented on FIG. 2, one arm end type 19 is provided with symmetrical hollow notches 20; in this case, said end is inserted and coupled to the connecting member as represented in FIG. 3, that is, below the central curve 16b of spring 16. Thus, while notches 20 engage the terminal teeth 21 of element 11, the elastic reaction of the spring pushes the arm end against edges 15 of element 11. To release the arm from the connecting member it is sufficient to lift it with respect to element 11 in the direction indicated by arrow x of FIG. 3 until the notches 20 are disengaged from teeth 21 and then to extract it; the connection is on the other hand, effected by a forced coupling of end 19 which is inserted below the curve 16b.

When the ends 22 of the swinging arms are of the type which have no notches 20 but the known stop tooth 23 (FIG. 4) said tooth 23 engages the seat hole 18, formed in the bottom of the tile-shaped element, while end 22 is inserted above the terminal curve 16c, that is, between said curve and the bottom of element 11. The release of said connection is made, as known, by lowering the arm in the opposed direction of arrow x and disengaging tooth 23 from seat 18.

To make the specification clearer, said movement to lower the curved parts 16b or 16c of spring 16 has been in both cases, attributed to the end of the arm, but in reality, the movement in directions opposed to the described ones, is imposed upon the connecting member with the already described results.

The particular shape of the blade spring 16 gives it a remarkably elastic reaction which in both cases assures the connection between the arm and member 11, while the presence of the retaining pair of teeth 21 and the particular shape of spring 16 allow the use of two types of arms with different ends, whereby the wiper blades provided with the connecting member according to the invention may be widely used on motor vehicles of different makes and types.

It is obvious that, while keeping the main particular features if the described connecting member unvaried, the same may undergo improvements and possible variants dictated by practical use.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A connecting member for securing windshield wiper blades to the end of a swinging arm, comprising a channel-shaped element provided at one end with means for articulating the member to a wiper blade, stop teeth near the other end of said element, and a hole in said element defining a seat, and a leaf spring within said element and secured at one end to said element, said leaf spring having two oppositely curved portions along its length, one of said curved portions being arranged to urge the end of a swinging arm coupled to said element toward said stop teeth so that the latter engages notches in the lateral edges of the swinging arm, and the second of said curved portions being arranged to urge the end of another type of swinging arm coupled to said element toward said hole seat so that a pin carried by the arm is pushed into said hole seat.

2. A connecting member as defined in claim 1 wherein said element is provided with flanges projecting inwardly from the side edges of said element, said flanges being between said articulating means and said stop teeth, and said element having a C-shaped cross section in the region of said flanges.

3. A connecting member as defined in claim 2 wherein said one curved portion of said spring engages said flanges, and the end of a swinging arm of the type having lateral notches is inserted between said one curved portion and said flanges.

4. A connecting member as defined in claim 2 wherein said element has a central protion spaced from and parallel to said flanges, said hole seat being in said central portion, said second curved portion of said spring engaging said central portion of said element, and the end of a swinging arm of the type having a pin is inserted between said second curved portion and said central portion.

* * * * *